US006874081B2

(12) United States Patent (10) Patent No.: US 6,874,081 B2
Kruckemyer et al. (45) Date of Patent: Mar. 29, 2005

(54) SELECTION OF LINK AND FALL-THROUGH ADDRESS USING A BIT IN A BRANCH ADDRESS FOR THE SELECTION

(75) Inventors: David A. Kruckemyer, Mountain View, CA (US); Daniel C. Murray, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 699 days.

(21) Appl. No.: 09/860,817

(22) Filed: May 17, 2001

(65) Prior Publication Data

US 2002/0174327 A1 Nov. 21, 2002

(51) Int. Cl.[7] .................................................. G06F 9/32
(52) U.S. Cl. ........................ 712/242; 712/234; 711/220
(58) Field of Search ................................ 712/231, 233, 712/234, 242; 711/211, 213, 217, 218, 220

(56) References Cited

U.S. PATENT DOCUMENTS

| 4,449,185 | A | * | 5/1984 | Oberman et al. ........... 712/234 |
| 5,522,053 | A |   | 5/1996 | Yoshida et al. |
| 5,559,975 | A | * | 9/1996 | Christie et al. ............. 712/230 |
| 5,848,268 | A |   | 12/1998 | Matsuo |
| 5,954,816 | A | * | 9/1999 | Tran et al. .................. 712/239 |
| 6,038,660 | A | * | 3/2000 | Singh et al. ................ 712/230 |
| 6,151,671 | A | * | 11/2000 | D'Sa et al. ................. 712/239 |

OTHER PUBLICATIONS

Tom R. Halfhill, "SiByte Reveals 64-Bit Core For NPUs; Independent MIPS64 Design Combines Low Power, High Performance," Microdesign Resources, Jun. 2000, Microprocessor Report, 4 pages.

SiByte, "Target Applications," http://sibyte.com/mercurian/applications.htm, Jan. 15, 2001, 2 pages.

SiByte, "SiByte Technology," http://sibyte.com/mercurian/technology.htm, Jan. 15, 2001, 3 pages.

SiByte, "The Mercurian Processor," http://sibyte.com/mercurian, Jan. 15, 2001, 2 pages.

SiByte, "Fact Sheet," SB-1 CPU, Oct. 2000, rev. 0.1, 1 page.

SiByte, "Fact Sheet," SB-1250, Oct. 2000, rev. 0.2, 10 pages.

Stepanian, SiByte, SiByte SB-1 MIPS64 CPU Core, Embedded Processor Forum 2000, Jun. 13, 2000, 15 pages.

Jim Keller, "The Mercurian Processor: A High Performance, Power-Efficient CMP for Networking," Oct. 10, 2000, 22 pages.

* cited by examiner

Primary Examiner—Richard L. Ellis
Assistant Examiner—David J. Huisman
(74) Attorney, Agent, or Firm—Garlick Harrison & Markison LLP

(57) ABSTRACT

A link address/sequential address generation circuit is provided for generating a link/sequential address. The circuit receives the most significant bits of at least two addresses: a first address of a first set of bytes including a branch instruction and a second address of a second set of bytes contiguous to the first set. The least significant bits of the branch PC (those bits not included in the most significant bits of the addresses received by the circuit) are used to generate the least significant bits of the link/sequential address and to select one of the first address and the second address to supply the most significant bits.

22 Claims, 6 Drawing Sheets

SELECTION OF LINK AND FALL-THROUGH ADDRESS USING A BIT IN A BRANCH ADDRESS FOR THE SELECTION

BACKGROUND OF THE INVENTION

1. Field of the Invention

This invention is related to the field of processors and, more particularly, to address generation related to branch instructions within processors.

2. Description of the Related Art

Branch instructions present numerous challenges to processor designers. The existence of branch instructions in code, and the mechanisms that the processor includes to handle the branch instructions with high performance, are frequently large factors in determining the overall performance that a user may actually experience when using a system including the processor.

In addition to the performance challenges, branch instructions present other design challenges. For example, some branch instructions may be provided for use as procedure (or subroutine) calls. Such instructions provide a target address (the beginning of the desired subroutine), usually generated as the sum of one or more operands of the branch instruction, and also cause the address to which the procedure should return (the "return address") to be stored. A branch instruction at the end of the procedure may read the stored return address and branch to the return address. Accordingly, execution of branch instructions which store the return address requires two address calculations (one for the target address, and one for the return address). Additionally, the return address may be generated at or near the time of fetching the procedure call instruction for storage in a return stack prediction structure.

Another example of a challenging branch instruction is the conditional branch instruction. A conditional branch instruction is dependent on a condition code (generated during execution of a preceding instruction) and either branches to the target address specified by one or more operands of the branch instruction ("taken") or continues execution with the sequential instructions ("not taken"). Such instructions may also require two address calculations (for the target address and sequential address).

Performing two address calculations during execution of a branch instruction may be inefficient, in terms of hardware employed or in terms of the number of cycles of execution if sufficient hardware is not supplied to perform the address calculations in parallel. Furthermore, processors which employ branch prediction to predict the behavior of branch instructions (and thus to provide for speculative fetching and/or execution of the instructions subsequent to the branch instructions) may be subject to similar inefficiencies.

SUMMARY OF THE INVENTION

A link address/sequential address generation circuit is provided for generating a link/sequential address. The circuit receives the most significant bits of at least two addresses: a first address of a first set of bytes including a branch instruction and a second address of a second set of bytes contiguous to the first set. The least significant bits of the branch PC (those bits not included in the most significant bits of the addresses received by the circuit) are used to generate the least significant bits of the link/sequential address and to select one of the first address and the second address to supply the most significant bits. The circuitry may be smaller than a full adder for producing the sequential address, and thus the sequential address may be generated efficiently. An adder for generating the link address at the fetch of a branch and link instruction and an adder in the execution unit which executes the branch for generating the sequential/link address may be avoided.

Broadly speaking, an apparatus for generating a sequential address for a branch instruction is contemplated. The apparatus comprises a multiplexor coupled to receive: (i) a most significant portion of a first program counter (PC), the most significant portion of the first PC locating a first set of bytes including the branch instruction within a memory, and (ii) a most significant portion of a second PC, the most significant portion of the second PC locating a second set of bytes in the memory, the second set of bytes contiguous to the first set of bytes and stored at a numerically higher address. The apparatus further comprises a circuit coupled to receive at least a first bit of a branch PC locating the branch instruction in the memory, the first bit being a most significant bit of the branch PC exclusive of the most significant portions received by the multiplexor, and wherein the circuit provides a selection signal to the multiplexor responsive to at least the first bit for selecting one of the most significant portion of the first PC and the most significant portion of the second PC as an output.

Additionally, a processor is contemplated. The processor comprises a fetch program counter (PC) generation circuit configured to generate a first PC and a second PC equal to the first PC incremented by a constant, a control circuit configured to supply control signals to the fetch PC generation circuit and to provide a portion of a branch PC in response to detecting a branch instruction within a set of bytes corresponding to the first PC, and a first circuit. The first circuit is coupled to receive a most significant portion of the first PC and the second PC, the most significant portion excluding portions corresponding to the portion of the branch PC provided by the control circuit. The first circuit is further coupled to receive the portion of the branch PC and configured to select one of the most significant portions of the first PC and the second PC responsive to at least a most significant bit of the portion of the branch PC.

Moreover, a processor is contemplated. The processor comprises the fetch program counter (PC) generation circuit, a control circuit configured to supply control signals to the fetch PC generation circuit and to detect a branch instruction within a set of bytes corresponding to the first PC, a second circuit coupled to receive the second PC and at least one other address and to receive control signals from the first circuit to select an output address, and an execution unit coupled to receive the output address from the second circuit during execution of the branch instruction. The output address is the second PC if the branch instruction is conditional or updates a link resource. The execution unit is further coupled to receive a branch PC during execution of the branch instruction, and the execution unit is configured to select a most significant portion of a sequential address to the branch instruction from a most significant portion of the output address and the branch PC responsive to at least a first bit of the branch PC. The first bit is a most significant bit of the branch PC exclusive of the most significant portion.

Still further, a method is contemplated. A first program counter (PC) is generated. The first PC locates a first set of bytes in a memory, and the first set of bytes includes a branch instruction. A second PC is also generated. The second PC is equal to the first PC incremented by a constant. One of a most significant portion of the first PC and a most significant portion of the second PC is selected as a most significant portion of a sequential address of the branch instruction responsive to at least a first bit of a branch PC locating the branch instruction in the memory. The first bit is a most significant bit of the branch PC exclusive of the most significant portion.

BRIEF DESCRIPTION OF THE DRAWINGS

The following detailed description makes reference to the accompanying drawings, which are now briefly described.

Figure 1:
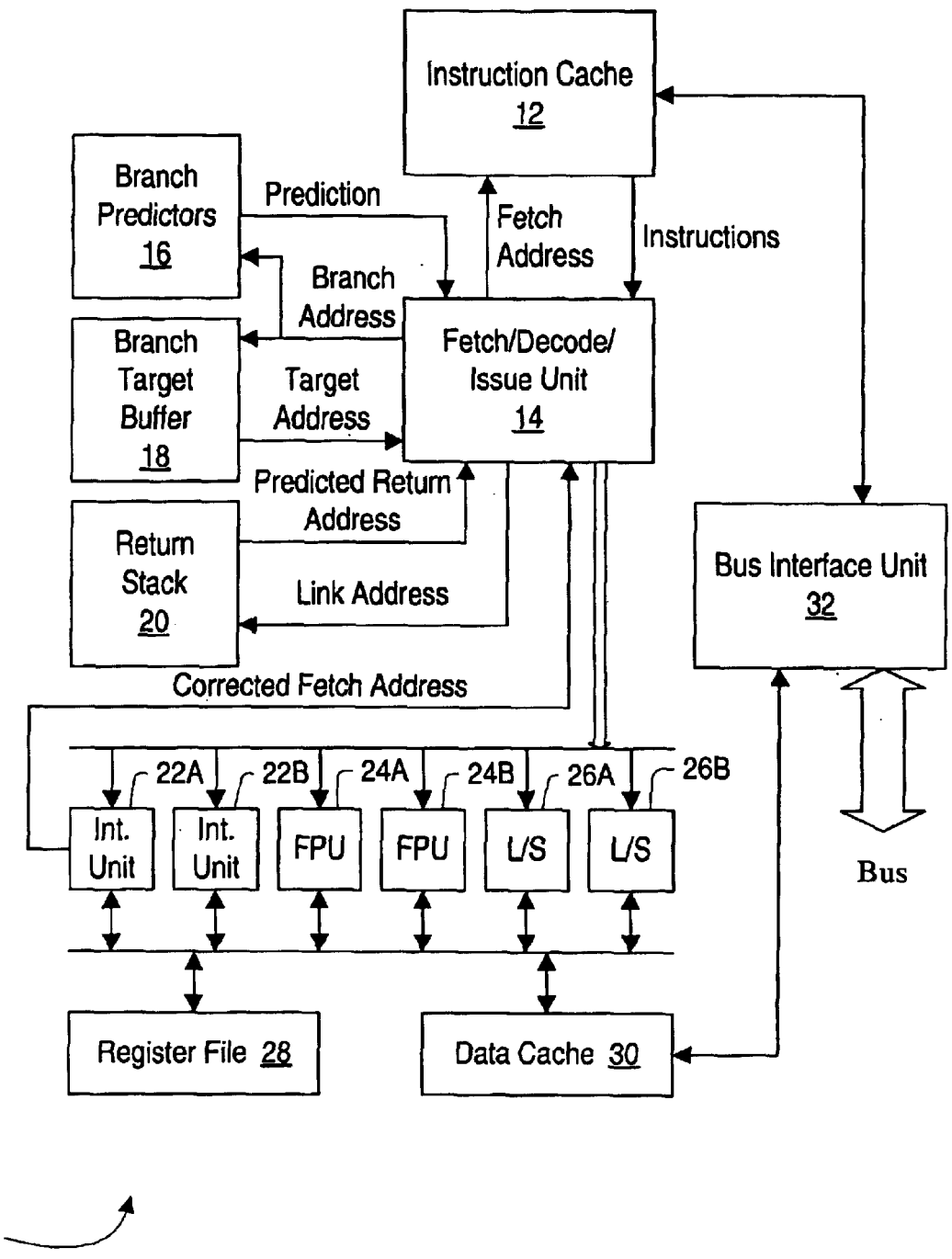
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram of one embodiment of a processor 10 is shown. Other embodiments are possible and contemplated. In the embodiment of FIG. 1, the processor 10 includes an instruction cache 12, a fetch/decode/issue unit 14, a branch predictors unit 16, a branch target buffer 18, a return stack 20, a set of integer execution units 22A–22B, a set of floating point execution units 24A–24B, a set of load/store execution units 26A–26B, a register file 28, a data cache 30, and a bus interface unit 32. The instruction cache 12 is coupled to the bus interface unit 32, and is coupled to receive a fetch address from and provide corresponding instructions to the fetch/decode/issue unit 14. The fetch/decode/issue unit 14 is further coupled to the branch predictors 16, the branch target buffer 18, the return stack 20, and the execution units 22A–22B, 24A–24B, and 26A–26B. Specifically, the fetch/decode/issue unit 14 is coupled to provide a branch address to the branch predictors 16 and the branch target buffer 18, and to receive a prediction from the branch predictors 16 and a target address from the branch target buffer 18. The fetch/decode/issue unit 14 is coupled to provide a link address to the return stack 20 and to receive a predicted return address from the return stack 20. The fetch/decode/issue unit 14 is coupled to provide instructions for execution to the execution units 22A–22B, 24A–24B, and 26A–26B and to receive a corrected fetch address from the integer execution unit 22A. The execution units 22A–22B, 24A–24B, and 26A–26B are generally coupled to the register file 28 and the data cache 30, and the data cache 30 is coupled to the bus interface unit 32.

Generally speaking, the fetch/decode/issue unit 14 is configured to generate fetch addresses for the instruction cache 12 and to receive corresponding instructions therefrom. The fetch/decode/issue unit 14 uses branch prediction information to generate the fetch addresses, to allow for speculative fetching of instructions prior to execution of the corresponding branch instructions. Specifically, in the illustrated embodiment, the fetch/decode/issue unit 14 may provide a branch address of the branch instruction to be predicted to the branch predictors 16 and the branch target buffer 18. The branch predictors 16 may be an array of branch predictors indexed by the branch address. A prediction is generated from the selected branch predictor and provided to the fetch/decode/issue unit 14 (e.g. the typical two bit counters which are incremented when the corresponding branch is taken, saturating at 11 in binary, and decremented when the corresponding branch is not taken, saturating at 00 in binary, with the most significant bit indicating taken or not taken). The fetch/decode/issue unit 14 may use the branch prediction to select the next fetch address as either the target address or the sequential address of a conditional branch instruction. While any size and configuration may be used, one implementation of the branch predictors 16 may be 4 k entries in a direct-mapped configuration. The branch target buffer 18 may be an array of branch target addresses. The target addresses may be previously generated target addresses of any type of branch, or just those of indirect branches. Again, while any configuration may be used, one implementation may provide 64 entries in the branch target buffer 18. Still further, the return stack 20 may be used to store link addresses of branch instructions which update a link resource ("branch and link" instructions). Such branch and link instructions may be used as procedure calls, and the corresponding return which terminates the called procedure may use the stored link address to return to the next instruction after the procedure call. The fetch/decode/issue unit 14 may provide link addresses when branch instructions which update the link register are fetched for pushing on the return stack 20, and the return stack 20 may provide the address from the top entry of the return stack 20 as a predicted return address. The predicted return address may be selected as the next fetch address if a return is detected by the fetch/decode/issue unit 14. While any configuration may be used, one implementation may provide 8 entries in the return stack 20.

The fetch/decode/issue unit 14 decodes the fetched instructions and queues them in one or more instruction queues for issue to the appropriate execution units. The integer execution units 22A–22B are generally capable of handling integer arithmetic/logic operations, shifts, rotates, etc. At least the integer execution unit 22A is configured to execute branch instructions, and in some embodiments both of the integer units 22A–22B may handle branch instructions. In one implementation, only the execution unit 22B executes integer multiply and divide instructions although both may handle such instructions in other embodiments. The floating point execution units 24A–24B similarly execute the floating point instructions. The integer and floating point execution units 22A–22B and 24A–24B may read and write operands to and from the register file 28 in the illustrated embodiment, which may include both integer and floating point registers. The load/store units 26A–26B may generate load/store addresses in response to load/store instructions and perform cache accesses to read and write memory locations through the data cache 30 (and through the bus interface unit 32, as needed), transferring data to and from the registers in the register file 28 as well.

The instruction cache 12 may have any suitable configuration and size, including direct mapped, fully associative, and set associative configurations. Similarly, the data cache 30 may have any suitable configuration and size, including any of the above mentioned configurations. In one implementation, each of the instruction cache 12 and the data cache 30 may be 4 way set associative, 32 kilobyte (kb) caches including 32 byte cache lines. Both the instruction cache 12 and the data cache 30 are coupled to the bus interface unit 32 for transferring instructions and data into and out of the caches in response to misses, flushes, coherency activity on the bus, etc.

In one implementation, the processor 10 is designed to the MIPS instruction set architecture (including the MIPS-3D and MIPS MDMX application specific extensions). The MIPS instruction set may be used below as a specific example of certain instructions. However, other embodiments may implement the IA-32 or IA-64 instruction set architectures developed by Intel Corp., the PowerPC instruction set architecture, the Alpha instruction set architecture, the ARM instruction set architecture, or any other instruction set architecture.

The illustrated embodiment may perform instruction execution in order. However, other embodiments may employ out of order execution, as desired. It is noted that, while FIG. 1 illustrates two integer execution units, two floating point execution units, and two load/store units, other embodiments may employ any number of each type of unit, and the number of one type may differ from the number of another type.

Sequential Address Generation

The processor 10 may support an efficient mechanism for sequential address generation for branch instructions. In some instruction set architectures, the sequential address is the address of the instruction which immediately follows the branch instruction in sequential order. In the MIPS instruction set architecture (as well as some others), a branch delay slot is implemented in which the instruction which immediately follows the branch instruction is executed regardless of whether or not the branch is taken. In such architectures, the sequential address may be the address of the second instruction immediately following the branch. In the MIPS instruction set, instructions are 32 bits (4 bytes), and thus the sequential address of a branch is the address of the branch plus 8 bytes. This sequential address will be used as an example in the following discussion, although the exact increment of the address to generated the sequential address may vary from instruction set to instruction set.

Rather then include a separate incrementor for generating the sequential address (in both the integer execution unit 22A and in the fetch/decode/issue unit 14 for generating the link address), the processor 10 may generate the link address using the fetch address used to fetch the branch instruction from the instruction cache 12 and a second address which is the fetch address incremented by a constant. The second address would be used as the next fetch address if a branch instruction is not within the instructions fetched in response to the fetch address. The fetch address and the second address may be aligned to a fetch group boundary, where a fetch group is the size of the number of instruction bytes fetched from the instruction cache 12 in one fetch. For example, a fetch group of 16 contiguous bytes (4 MIPS instructions) may be used. Thus, the fetch address and the second address may be aligned to a 16 byte boundary. The constant used to generate the second address from the fetch address may be 16. Larger and/or smaller fetch group sizes may be used in other embodiments.

The branch instruction is located within the fetch group corresponding to the fetch address, and the second address locates the next sequential fetch group of 16 bytes (i.e. the group of bytes contiguous to the fetch group corresponding to the fetch address and stored at a numerically higher address). Since the sequential address is the address of the branch instruction plus 8, the most significant bits of the sequential address (e.g. those which define the fetch group) are either the same as the most significant bits of the fetch address or the most significant bits of the second address. The least significant bits of the branch address (those bits forming the offset within the fetch group) may be used to both generate the least significant bits of the sequential address and to select the most significant bits of the sequential address from either the fetch address or the second address. For example, to generate the sequential address for the MIPS instruction set, bit 3 (where the least significant bit is bit 0) of the branch address may be inverted and the remaining least significant bits of the branch address may remain unmodified to represent incrementing by 8 (which is 1000 in binary). The most significant bits defining the fetch group have bit 4 as the least significant bit, and thus bit 3 of the branch address can be used to select between the fetch address and the second address as well. If bit 3 is a zero, the addition of 8 does not produce an address outside of the fetch group including the branch instruction and thus the fetch address is selected. If bit 3 is a one, the addition of 8 does produce an address outside of the fetch group: it is an address within the fetch group located by the second address. Accordingly, the second address is selected for this case. In this manner, a multiplexor and an inverter may be added for generating the sequential address for the above example, rather than an incrementor. The second address may be provided to the execution units as well, so that a similar mechanism can be used to generate the sequential address (or link address) during execution of the branch instruction, if needed.

Figure 2:
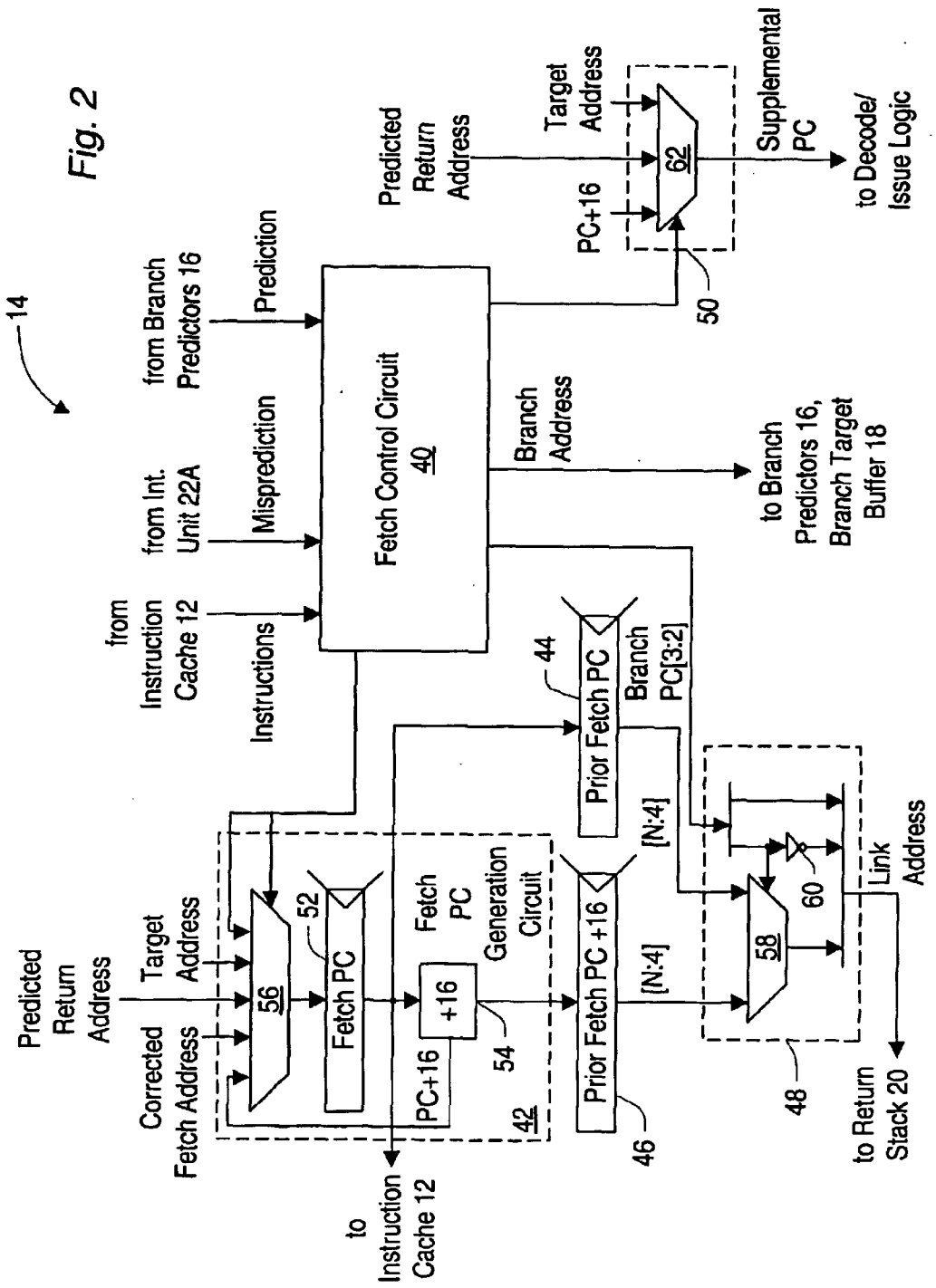
FIG. 2 is a block diagram of a portion of a fetch/decode/issue unit shown in FIG. 1.

Turning now to FIG. 2, a block diagram of one embodiment of a portion of the fetch/decode/issue unit 14 (particularly, the fetch logic) is shown. Other embodiments are possible and contemplated. As illustrated in FIG. 2, the fetch logic includes a fetch control circuit 40, a fetch program counter (PC) generation circuit 42, PC registers 44 and 46, a link address generation circuit 48, and a supplemental PC generation circuit 50. The fetch PC generation circuit 42 includes a fetch PC register 52, an incrementor 54 for incrementing the value in the fetch PC register 52 by 16 to produce a PC+16, and a multiplexor (mux) 56. The mux 56 is coupled to receive the PC+16, the corrected fetch address from the integer execution unit 22A, the predicted return address from the return stack 20, the target address from the branch target buffer 18, and a target address generated by the fetch control circuit 40. The mux 56 is further coupled to receive selection controls from the fetch control circuit 40. The fetch PC generation circuit 42 is coupled to provide the fetch PC from the fetch PC register 52 to the instruction cache 12 and to the PC register 44. Additionally, the fetch PC generation circuit 42 is coupled to provide the PC+16 to the PC register 46. The outputs of both PC registers 44 and 46 are coupled to the link address generation circuit 48, which is also coupled to receive the least significant bits of a branch PC (bits[3:2] in the illustrated embodiment) from the fetch control circuit 40. The link address generation circuit 48 generates a link address for the return stack 20, and includes a mux 58 and an inverter 60. The mux 58 is coupled to receive the fetch PC and the PC+16 (specifically, bits N:4 in the illustrated embodiment, where bit N is the most significant address bit) and is coupled to receive bit 3 of the branch PC as a selection control. The inverter 60 is also coupled to receive bit 3 of the branch PC. The fetch control circuit 40 is coupled to receive instructions from the instruction cache 12, a misprediction signal from the integer execution unit 22A, and the prediction from the branch predictors 16. The fetch control circuit 40 is coupled to provide the branch address to the branch predictors 16 and the branch target buffer 18, and is coupled to provide a selection control to a mux 62 comprising the supplemental PC generation circuit 50 in the illustrated embodiment. The mux 62 is coupled to receive the PC+16, the predicted return address from the return stack 20, and the target address from the branch target buffer 18.

As mentioned above, the fetch group of the illustrated embodiment is four instructions (16 bytes). Accordingly, the fetch PC generation circuit 42 generates, for a given fetch PC, the PC+16 (using incrementor 54). The PC+16 may be the next fetch address if no branch instructions are detected in the fetch group corresponding to the fetch PC and no corrected fetch address is received from the integer execution unit 22A. Other sources for the next fetch address include the corrected fetch address (for mispredicted branch instructions or exceptions, or an additional input may be received by the mux 56 for exceptions), the predicted return address from the return stack 20, the target address from the branch target buffer 18, and a target address generated by the fetch control circuit 40. The target address generated by the fetch control circuit 40 may be the target address for relative branch instructions (branch instructions whose target address is an offset from the branch PC of the relative branch instruction or the PC of the next instruction). In other alternatives, the branch target buffer 18 may store target addresses for relative branch instructions as well as indirect branch instructions, and the input from the fetch control circuit 40 may be eliminated.

Generally, the fetch control circuit 40 analyzes the instructions from the fetch group located by the fetch PC, the misprediction signal from the integer execution unit 22A, and the prediction signal from the branch predictors 16 to determine which next fetch address should be selected through the mux 56. The selected address is stored in the fetch PC register 52 and is provided to the instruction cache 12 for fetching the corresponding instructions. Additionally, the selected address is provided to PC register 44 for storage. The PC+16 is also provide to PC register 46 for storage.

Additionally, the fetch control circuit 40 may examine the instructions to detect a branch instruction therein and may generate a portion of the branch PC in response to detecting the branch instruction. Particularly, the portion of the branch PC which is an offset within the fetch group may be generated (branch PC[3:2] for the example of FIG. 2).

The portion of the branch PC and the PCs stored in PC registers 44 and 46 are used by the link address generation unit 48 to generate the link address to be pushed onto the return stack if the branch instruction is a procedure call (a branch and link instruction). Particularly, for the illustrated embodiment, the portions of the PCs stored in PC registers 44 and 46 which define the fetch groups are provided (e.g. bits N:4, wherein N is the most significant bit of the address). As described above, the sequential address to a branch located anywhere in the fetch group corresponding to the fetch PC is either an address to another byte within the fetch group or is an address to a byte in the next consecutive fetch group (corresponding to the fetch PC+16). Since, in this embodiment, the sequential address of the branch is the branch PC plus 8, the least significant 4 bits of the sequential address are equal to the least significant four bits of the branch PC except that the most significant bit (bit 3) is inverted. Additionally, if bit 3 is a zero, then the sequential address locates another byte within the fetch group and thus the fetch PC is selected for the most significant bits N:4 of the sequential address. If bit 3 is a one, adding 8 to the branch PC results in a PC within the next fetch group and thus the fetch PC+16 is selected as the most significant bits N:4 of the sequential address. Accordingly, bit 3 is provided as the selection control to the mux 58. The link address is formed as a concatenation of the most significant bits selected through the mux 58, the output of the inverter 60, and the remaining least significant bits of the branch PC. In the illustrated embodiment, the only remaining bit is bit 2, since bits 1 and 0 are guaranteed to be zero for any instruction in the MIPS instruction set. In other instruction set architectures, particularly ones which are variable length, bits 1 and 0 may be included as well.

In this manner, the link address is generated without requiring a full adder to add the branch PC and 8. A much smaller amount of hardware may be used, improving the efficiency of the address generation.

It is noted that, in other embodiments, the portion of the fetch PCs provided may be made larger and/or the sequential address may be generated using a larger or smaller increment. Generally, the portion of the branch PC provided to the link address generation circuit may be the portion of the branch PC exclusive of the most significant portion provided to the mux 58. If the portion of the branch PC includes more significant bits than the bit which is changed by the increment (e.g. bit 3 in the above example), then additional circuitry may be provided to increment these more significant bits. For example, if fetch groups were 32 bytes in size (and thus the most significant bits of the PCs would be N:5), bit 3 of the link address would be generated using the inverter 60 and bit 4 of the link address would be generated as the exclusive OR of bit 3 of the branch PC and bit 4 of the branch PC. Additionally, the select signal to the mux 58 would be generated as the AND of bits 3 and 4. Generally, for an increment of 8, the select signal to the mux 58 would be the AND of bit 3 of the branch PC and each more significant bit of the branch PC which is provided to the link address generation circuit 48. The more significant bits of the link address would generally be generated as an increment function of the less significant bits. However, this circuitry would still generally be much smaller than a full N+1 bit incrementor.

While the PC registers 44 and 46 are used in the present embodiment to generate the link address in the next clock cycle after the fetch PC is generated, other embodiments may not delay the link address generation or may delay for more clock cycles, as desired. Generally, the link address generation may be available for pushing onto the return stack 20 during the clock cycle that a branch within the corresponding fetch group can be identified.

The fetch control circuit 40 also selects a supplemental PC using the supplemental PC generation circuit 50 dependent on the type of branch instruction detected. Generally, instructions are provided to the decode/issue logic within the fetch/decode/issue unit 14 (and later issued to the execution units 22A–22B, 24A–24B, and 26A–26B, as may be applicable) with the PC of the instruction carried along for each instruction as additional information. Additionally, the supplemental PC may be provided at least for branch instructions. Particularly, for branch and link instructions and for conditional branch instructions, the PC+16 may be supplied as the supplemental PC. The execution unit may use a circuit similar to the link address generation circuit 48 to generate the sequential address/link address for such branch instructions, eliminating the need for a second full adder circuit in the execution unit to generate this address. The supplemental PC may also provide information used to ensure that predicted information was correct. For example, for indirect branch instructions, it is possible that the target address predicted by the branch target buffer 18 is incorrect (as the operands used by the indirect branch instruction may have changed). Thus, for indirect branch instructions, the supplemental PC may be the target address. The execution unit executing the branch may verify that the target address generated during execution matches the predicted target address and may signal a misprediction if the addresses do not match. For returns, the address at the top of the return stack 20 may be predicted as the return address (and again, the predicted address may be incorrect). Thus, the supplemental PC may be the predicted return address for return instructions. The execution unit may verify that the actual return address matches the predicted return address and may signal a misprediction if the addresses do not match.

It is noted that, while the embodiment of the fetch control circuit 40 shown in FIG. 2 analyzes the instructions fetched in response to a fetch PC to determine if a branch is included therein, other embodiments may analyze other information. For example, predecode information stored with respect to instructions stored in the instruction cache 12 may be received by the fetch control circuit 40. Other embodiments may analyze prediction information from a separate branch prediction array which may predict the location and type of branch instructions within the fetch group. Generally, the fetch control circuit 40 may use any suitable information to detect a branch instruction within a set of instruction bytes corresponding to the fetch PC.

The fetch control circuit 40 generates a branch address for transmission to the branch predictors 16 and the branch target buffer 18. The branch address may be the actual address of the branch (detected within the fetch group), or may be generated in some other fashion. For example, the fetch PC may be provided as the branch address, in some embodiments, rather than the branch PC. Such embodiments may allow the branch prediction information to be accessed earlier in the pipeline than if the branch instruction is detected within the fetch group first and the branch address is generated in response to detecting the branch instruction. Thus, generally, the fetch control circuit 40 outputs a branch address indicative of the branch instruction.

It is noted that, as used herein, the term "program counter" refers, with respect to a particular instruction, to the address which locates the particular instruction in memory. In other words, the PC of the particular instruction is the address used to fetch the particular instruction from memory. With respect to a fetch group, the PC is the address which locates the first byte in the fetch group (the byte stored at the lowest numerical address). The phrase "exclusive of a portion" when referring to a value is the bits of the value remaining after the portion is excluded. For example, "most significant bit (or bits) exclusive of a portion" refers to the most significant bit (or bits) of the value when the portion is excluded from the value (i.e. the most significant bit or bits remaining after the portion has been excluded). The term "sequential address", when used with respect to a branch instruction, is the address of the first instruction to be executed if the branch is not taken and which would not be executed if the branch is taken. The term "link address" refers to the address stored by branch instructions which update a link resource in addition to branching. The link address may be used interchangeably with "return address" and is generally available for reading by another branch instruction. The combination of branch and link instructions and branch instructions which read the link resource may be used to perform procedure calls and returns, respectively. The link resource may be a special purpose register dedicated for storing the link address (e.g. the PowerPC instruction set architecture's link register), or a general purpose register (e.g. MIPS R31). The link resource may also be a memory location (e.g. the IA-32 instruction set architecture's CALL instruction, which stores the return address on the stack). A branch instruction which reads the link resource and uses it as a target address is referred to as "return instruction" or just a "return" herein. Finally, the term "indirect branch instruction" or "indirect branch" refers to a branch instruction which generates its target address using at least one operand other than the PC and a displacement. The indirect branch instruction could have a memory operand or a register operand, for example, used to generate the target address.

Figure 3:
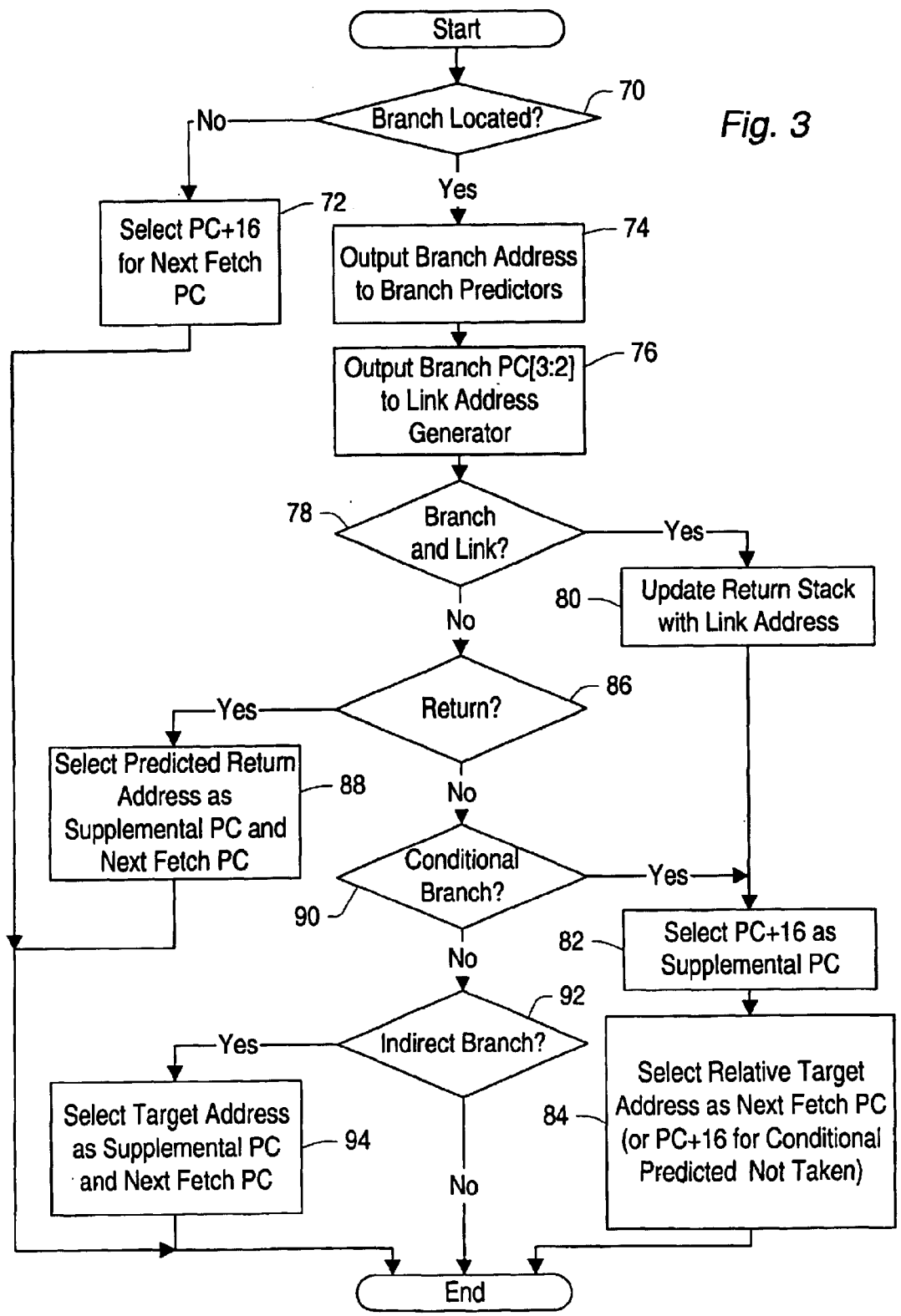
FIG. 3 is a flowchart illustrating operation of one embodiment of a fetch control circuit shown in FIG. 2.

Turning now to FIG. 3, a flowchart is shown illustrating operation of one embodiment of the fetch control circuit 40. Other embodiments are possible and contemplated. The blocks shown in FIG. 3 are illustrated in a particular order for ease of understanding. However, any order may be used. Furthermore, blocks may be performed in parallel in combinatorial logic circuitry within the fetch control circuit 40.

Not shown in FIG. 3 is the operation if a misprediction is signalled by the integer execution unit 22A, or if an exception is signalled. Either of these cases may take precedence over the operation illustrated in FIG. 3, and may cause the corrected fetch address (or exception vector) to be selected as the next fetch address.

The fetch control circuit 40 detects whether or not a branch instruction is included within a fetch group (decision block 70). If a branch instruction is not included, the fetch control circuit 40 signals the fetch PC generation circuit 42 to select the PC+16 as the next fetch address (block 72). Any address may be selected as the supplemental PC, since there is no branch instruction in the fetch group.

If a branch instruction is included within the fetch group, the fetch control circuit 40 may output the branch address to the branch predictors 16 and the branch target buffer 18 (block 74). As mentioned above, the branch address may be the branch PC. Alternatively, as mentioned above, the fetch PC may be the branch address and may be output when generated by the fetch PC generation circuit 42. Additionally, the portion of the branch PC used by the link address generation circuit 48 is output thereto (block 76).

The fetch control circuit 40 may determine the type of branch instruction for selecting the next fetch PC and or the supplemental PC. If the branch instruction is a branch and link (decision block 78), the fetch control circuit 40 signals the return stack 20 to update with the link address provided from the link address generation circuit 48 (block 80). Additionally, the fetch control circuit 40 may signal the supplemental PC generation circuit 50 to select the PC+16 as the supplemental PC (block 82). Alternatively, the link address generated by the link address generation circuit 48 may be provided as an input to the supplemental PC generation circuit 48 and may be selected thereby. In such an alternative, the circuit for generating the sequential address in the execution unit or units may be eliminated. Additionally, the fetch control circuit 40 may signal the fetch PC generation circuit 42 to select the relative target address as the next fetch PC (or the PC+16, if the branch and link is conditional and predicted not taken) (block 84).

If the instruction is a return instruction (decision block 86), then the fetch control circuit 40 may signal both the supplemental PC generation circuit 50 and the fetch PC generation circuit 42 to select the predicted return address from the return stack 20 (block 88).

If the instruction is a conditional branch instruction (decision block 90), the fetch control circuit 40 may signal the supplemental PC generation circuit 50 to select the PC+16 (or alternatively the link address generated by the link address generation circuit 48, as mentioned above) (block 82). Additionally, the fetch control circuit 40 may signal the fetch PC generation circuit 42 to select either the relative target address or the PC+16, depending on whether or not the conditional branch instruction is predicted taken in the branch predictors 16 (block 84).

If the instruction is an indirect branch instruction (decision block 92), the fetch control circuit 40 may signal both the supplemental PC generation circuit 50 and the fetch PC generation circuit 42 to select the target address from the branch target buffer 18 (block 94).

Figure 4:
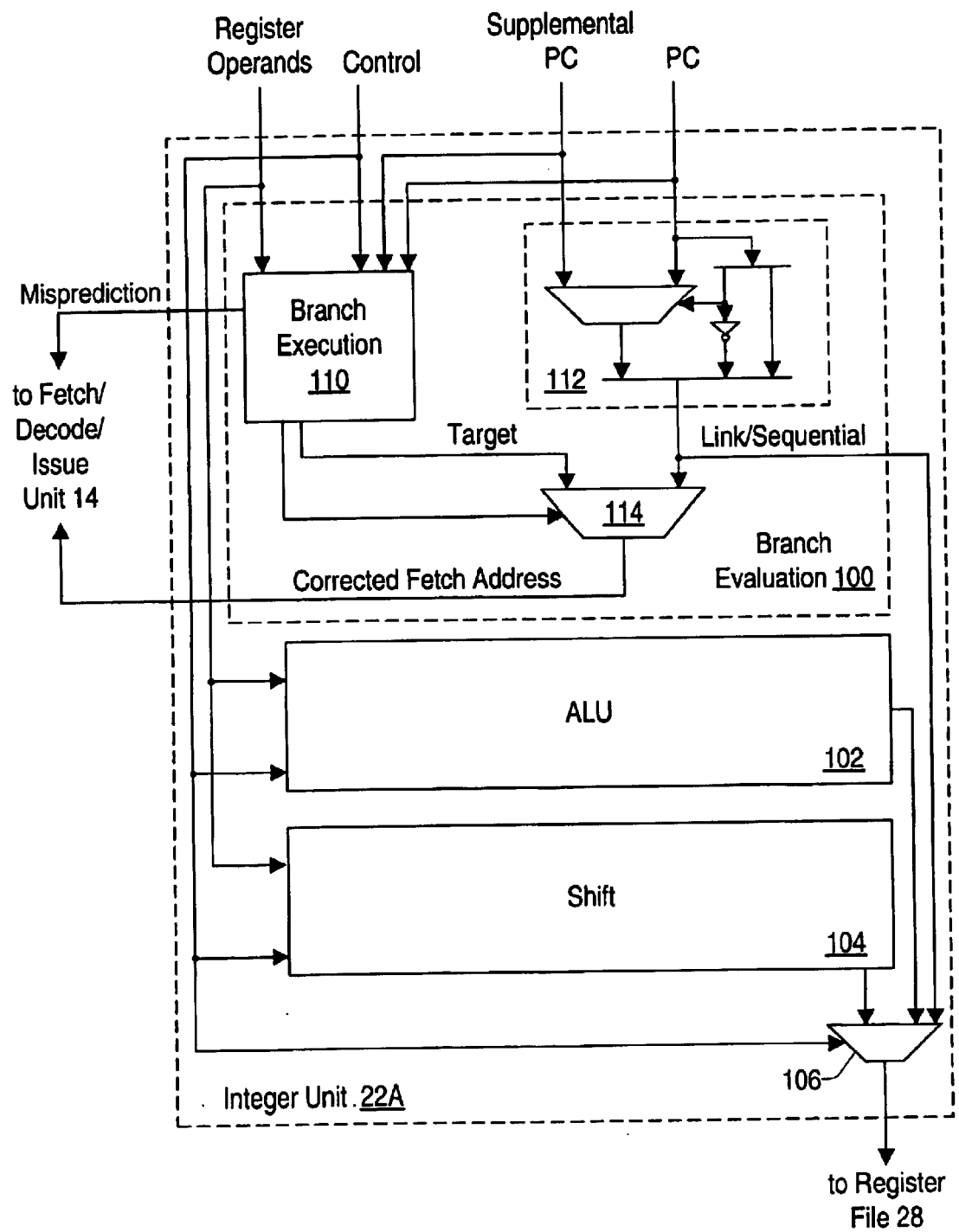
FIG. 4 is a block diagram of one embodiment of an integer unit shown in FIG. 1.

Turning next to FIG. 4, a block diagram illustrating one embodiment of the integer execution unit 22A is shown. Other embodiments are possible and contemplated. In the embodiment of FIG. 4, the integer execution unit 22A includes a branch evaluation circuit 100, an arithmetic/logic unit (ALU) 102, and a shift circuit 104. The integer execution unit 22A is coupled to receive register operands of the instruction to be executed (supplied from the register file 28), which are provided to the branch evaluation circuit 100, the ALU 102, and the shift circuit 104. The integer execution unit 22A is further coupled to receive control information indicating the operation to be performed from the fetch/decode/issue unit 14, and the control information is provided to the branch evaluation circuit 100, the ALU 102, and the shift circuit 104. The control information may include the opcode of the instruction, or a partially or fully decoded set of signals corresponding to the opcode. Furthermore, the control information may include a selection signal for an output mux 106, taken/not taken prediction information for branch instructions, etc. Additionally, the PC of the instruction and the supplemental PC are received by the integer execution unit 22A, and these PCs are provided to the branch evaluation circuit 100. Each of the ALU 102, the shift circuit 104, and the branch evaluation circuit 100 (more particularly, the sequential address generation circuit 112) are coupled to provide an input to output mux 106, which is coupled to provide an output to the register file 28.

The branch evaluation circuit 100 is illustrated in greater detail in FIG. 4. Particularly, the branch evaluation circuit 100 may include a branch execution circuit 110, a sequential address generation circuit 112, and a corrected fetch address mux 114. The branch execution circuit 110 is coupled to receive the register operands, control information, branch PC, and supplemental PC. The branch execution circuit 110 is coupled to provide a selection control to the corrected fetch address mux 114, which provides the corrected fetch address output from the integer execution unit 22A to fetch/decode/issue unit 14. Furthermore, the branch execution circuit 110 is coupled to provide a computed target address input to the corrected fetch address mux 114 and the misprediction signal to the fetch/decode/issue unit 14. The sequential address generation circuit 112 is coupled to receive the branch PC and the supplemental PC as inputs, and provides a link/sequential address as the output. The link/sequential address is an input to the corrected fetch address mux 114 and an input to the output mux 106.

Generally, the sequential address generation circuit 112 operates in the same fashion as the link address generation circuit 48 shown in FIG. 2. However, since the branch PC is provided to the sequential address generation circuit 112 instead of the fetch PC identifying the fetch group, a separate portion of the branch PC is not provided as is shown in FIG. 2. As described above, the supplemental PC in the case of conditional branch instructions and branch and link instructions is the PC+16. The resulting link/sequential address may be selected as the corrected fetch address (for conditional branch instructions predicted taken and actually not taken), and may be selected through the output mux 106 to update the link register (for branch and link instructions).

Generally, the branch execution circuit 110 executes the branch instruction, including determining if the taken/not taken prediction is correct (for conditional branches) and if the predicted target address is correct (for indirect branch instructions and returns). As mentioned above, for indirect branch instructions and returns, the supplemental PC is the predicted target address. If the branch execution circuit 110 detects a misprediction (either in the taken/not taken prediction or the predicted target address), the branch execution circuit 110 may signal a misprediction to the fetch/decode/issue unit 14 and may select the appropriate address through the corrected fetch address mux 114.

The branch execution circuit 110 may generate the target address for relative branch instructions and indirect branch instructions from the operands provided for the instruction. Alternatively, the ALU 102 may be used to generate the target address, which may be provided to the branch execution circuit 110 for comparison to the predicted target address and may also be provided to the corrected fetch address mux 114 for selection.

Generally, the ALU circuit 102 is configured to perform integer arithmetic and logic operations when the integer execution unit 22A is executing integer instructions. The shift circuit is configured to perform shift operations in response to integer shift instructions. It is noted that, while the integer execution unit 22A is used in the present embodiment to execute branch instructions, other embodiments may include a dedicated branch execution unit which executes only branch instructions. Such an embodiment may be similar to the branch evaluation circuit 100.

Figure 5:
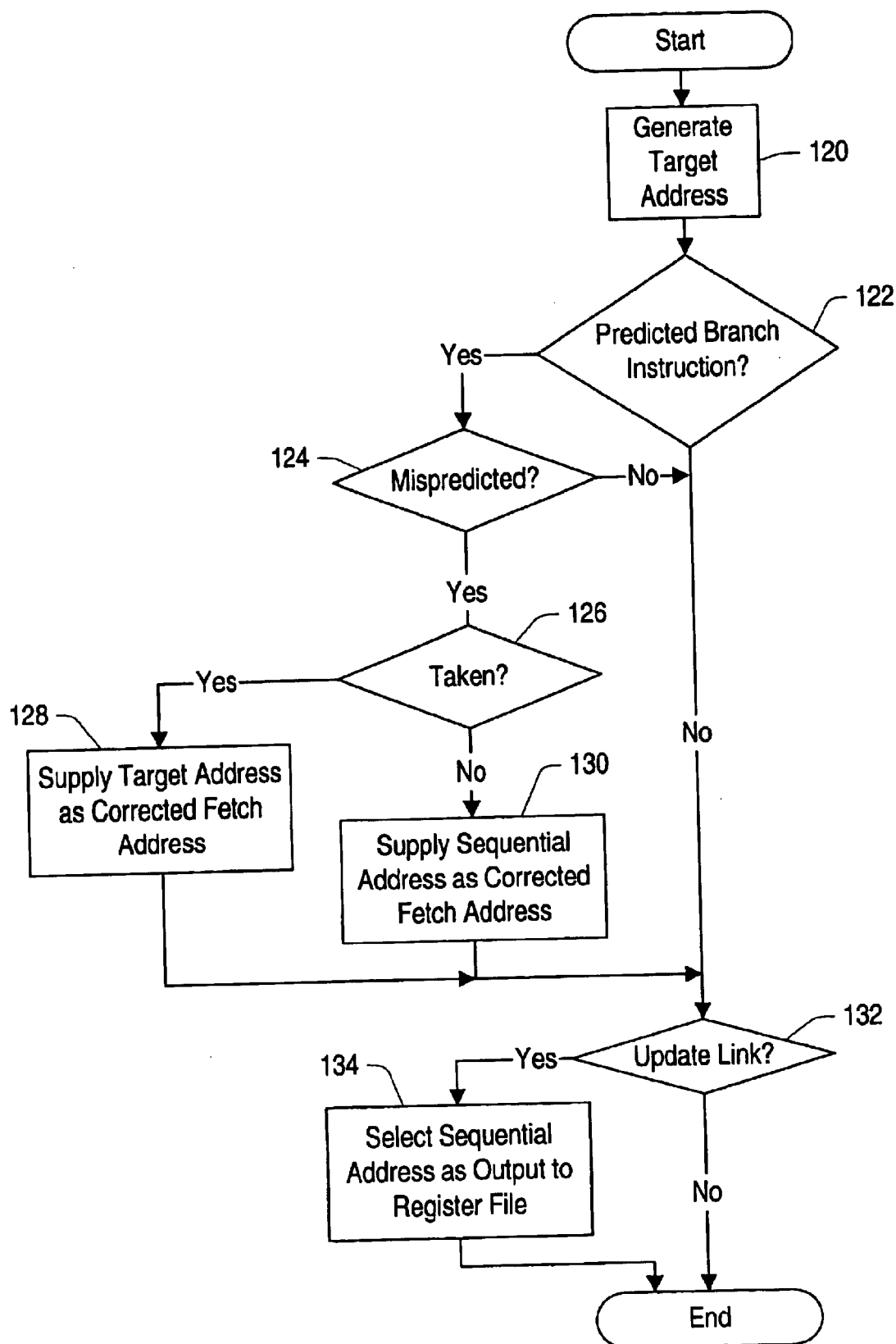
FIG. 5 is a flowchart illustrating operation of one embodiment of the integer unit shown in FIG. 4 during execution of a branch instruction.

Turning next to FIG. 5, a flowchart is shown illustrating operation of one embodiment of the integer execution unit 22A for executing a branch instruction. Other embodiments are possible and contemplated. The blocks shown in FIG. 5 are illustrated in a particular order for ease of understanding. However, any order may be used. Furthermore, blocks may be performed in parallel in combinatorial logic circuitry within the integer execution unit 22A. Particularly, blocks 122 and 132 may be independent and in parallel.

The integer execution unit 22A generates the target address for the branch instruction from one or more instruction operands (block 120). Additionally, the integer execution unit 22A determines if the branch instruction is a predicted branch instruction (decision block 122). A branch instruction is predicted if at least one of the taken/not taken decision or the target address is predicted. If the branch instruction is a predicted branch instruction, the integer execution unit 22A determines if the branch instruction is mispredicted (decision block 124). For conditional branch instructions, the integer execution unit 22A determines if the actual taken/not taken decision matches the predicted taken/not taken decision. For indirect branch instructions and return instructions, the integer execution unit 22A determines if the actual target address matches the predicted target address. If the branch instruction is mispredicted and is taken (decision block 126), the integer execution unit 22A supplies the target address as the corrected fetch address (block 128). If the branch instruction is mispredicted and is not taken, then the integer execution unit 22A supplies the sequential address as the corrected fetch address (block 130). The address generated by executing the branch instruction is essentially the result of the conditional branch instruction (e.g. the sequential address if the conditional branch is not taken and the target address if the conditional branch is taken). The corrected fetch address is transmitted when the actual taken/not taken does not match the predicted taken/not taken. Other branch instructions may have additional results (e.g. the branch and link may update the link resource with the link address).

More particularly in the illustrated embodiment of the integer execution unit 22A (FIG. 4), the branch execution circuit 110 may perform blocks 120–130 (or block 120 may be performed in the ALU 102). The branch execution circuit 110 may supply the corrected fetch address by selecting the corresponding address through the corrected fetch address mux 114.

Additionally, if the branch instruction updates the link resource (decision block 132), the integer execution unit 22A may select the sequential address (e.g. from the sequential address generation circuit 112) as the output to the register file 28 (e.g. via the output mux 106) (block 134).

Figure 6:
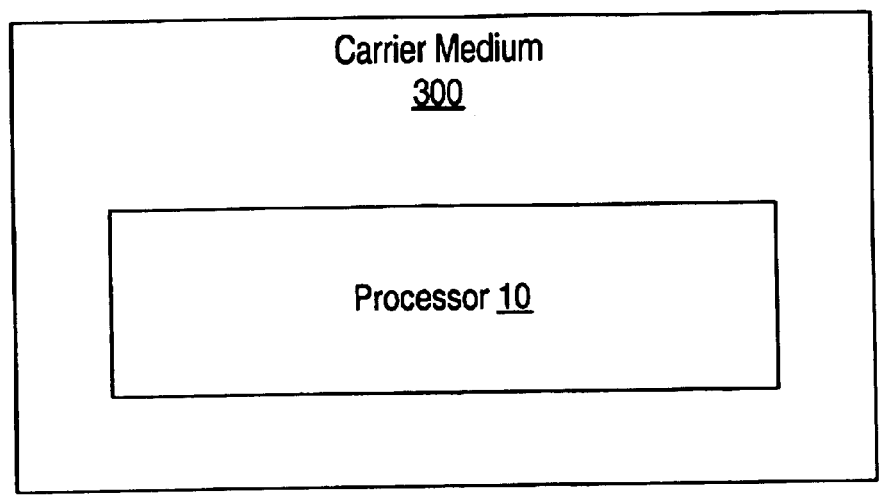
FIG. 6 is a block diagram of a carrier medium.

Turning next to FIG. 6, a block diagram of a carrier medium 300 including a database representative of the processor 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of the processor 10 carried on carrier medium 300 may be a database which can be read by a program and used, directly or indirectly, to fabricate the hardware comprising the processor 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the processor 10. The netlist may then be placed and routed to produce a data set describing geometric shapes to be applied to masks. The masks may then be used in various semiconductor fabrication steps to produce a semiconductor circuit or circuits corresponding to the processor 10. Alternatively, the database on carrier medium 300 may be the netlist (with or without the synthesis library) or the data set, as desired.

While carrier medium 300 carries a representation of the processor 10, other embodiments may carry a representation of any portion of processor 10, as desired, including any set of fetch control circuits, fetch PC generation circuits, link or sequential address generation circuits, supplemental PC generation circuits, fetch/issue/decode units, execution units, branch execution circuits, etc.

Numerous variations and modifications will become apparent to those skilled in the art once the above disclosure is fully appreciated. It is intended that the following claims be interpreted to embrace all such variations and modifications.

What is claimed is:

1. An apparatus for generating a sequential address for a branch instruction, the apparatus comprising:

a multiplexor coupled to receive: (i) a most significant N-bit portion of a first program counter (PC), the most significant N-bit portion of the first PC locating a first set of bytes including the branch instruction within a memory, and (ii) a most significant N-bit portion of a second PC, the most significant N-bit portion of the second PC locating a second set of bytes in the memory, the second set of bytes contiguous to the first set of bytes and stored at a numerically higher address; and a circuit coupled to receive at least a first bit of a branch PC locating the branch instruction in the memory, the first bit being a most significant bit of the branch PC exclusive of the most significant N-bit portions of the branch PC, and wherein the first bit is coupled to be used as a selection signal for the multiplexor to select between one of the most significant N-bit portion of the first PC and the most significant N-bit portion of the second PC as an output, the circuit further including an inverter to receive the first bit and to invert the first bit as part of the output.

2. The apparatus as recited in claim 1 wherein the sequential address comprises the output of the multiplexor concatenated with an inverted state of the first bit and further concatenated with bits of the portion of the branch PC which are less significant than the first bit.

3. The apparatus as recited in claim 1 wherein the most significant N-bit portion of the first PC is a most significant N-bit portion of the branch PC.

4. The apparatus as recited in claim 1 wherein the sequential address is a result of the branch instruction if the branch instruction is conditional and is not taken.

5. The apparatus as recited in claim 1 wherein the sequential address is a link address if the branch instruction updates a link resource.

6. The apparatus as recited in claim 5 wherein the apparatus is coupled to provide the link address to a return stack for storage.

7. A processor comprising:

a fetch program counter (PC) generation circuit configured to generate a first PC and a second PC equal to the first PC incremented by a constant;

a control circuit configured to supply control signals to the fetch PC generation circuit and to provide a portion of a branch PC exclusive of a most significant N-bits in response to detecting a branch instruction within a set of bytes corresponding to the first PC; and a first circuit coupled to receive a most significant N-bit portion of the first PC and a most significant N-bit portion of the second PC, the first circuit further including a multiplexor and further coupled to receive the portion of the branch PC and configured to select between one of the most significant N-bit portions of the first PC and the second PC in response to a first bit of the branch PC which is coupled to be used as a selection signal for the multiplexor, the first bit being a most significant bit of the portion of the branch PC, the first circuit further including an inverter to receive the first bit and to invert the first bit for output.

8. The processor as recited in claim 7 wherein the first circuit is configured to form an address as a concatenation of a selected one of the most significant N-bit portions of the first PC or the second PC with an inverted state of the first bit and further concatenated with a remaining portion of the branch PC.

9. The processor as recited in claim 8 further comprising a return stack, wherein the processor is configured to push the address onto the return stack if the branch instruction updates a link resource.

10. The processor as recited in claim 7 further comprising a second circuit coupled to receive the second PC and at least one other address, and wherein the second circuit is coupled to receive control signals from the first circuit to select an output address, and wherein the output address is the second PC if the branch instruction is conditional or updates a link resource.

11. The processor as recited in claim 10 wherein the at least one other address includes a return address from a return stack, and wherein the output address is the return address if the branch instruction is a return instruction.

12. The processor as recited in claim 10 wherein the at least one other address includes a predicted target address from a branch target buffer, and wherein the output address is the predicted target address if the branch instruction is an indirect branch.

13. The processor as recited in claim 10 further comprising an execution unit coupled to receive the output address from the second circuit and the branch PC during execution of the branch instruction, and wherein the execution unit is configured to select a most significant portion of a sequential address to the branch instruction from a most significant portion of the output address and a most significant portion of the branch PC responsive to the first bit of the branch PC.

14. The processor as recited in claim 13 wherein the execution unit is configured to form the sequential address by concatenating the most significant portion of the output address with an inverted state of the first bit of the branch PC and further concatenated with a remaining portion of the branch PC.

15. The processor as recited in claim 14 wherein the execution unit is configured to output the sequential address as a corrected fetch address to the fetch PC generation circuit responsive to the branch instruction being conditional, not taken, and predicted taken.

16. The processor as recited in claim 14 wherein the execution unit is configured to output the sequential address to a register file if the branch instruction updates a link resource.

17. The processor as recited in claim 13 wherein, if the branch instruction is an indirect branch or a return, the output address from the second circuit is a predicted target address, and wherein the execution unit is configured to verify that the predicted target address matches the actual target address of the branch instruction.

18. A method comprising:

generating a first program counter (PC) locating a first set of bytes in a memory, the first set of bytes including a branch instruction;

generating a second PC equal to the first PC incremented by a constant;

selecting between one of a most significant N-bit portion of the first PC and a most significant N-bit portion of the second PC as a most significant N-bit portion of a sequential address of the branch instruction responsive to a first bit of a branch PC locating the branch instruction in the memory, the first bit being a most significant bit of the branch PC exclusive of the most significant N-bit portion of the branch PC, the first bit being used as a selection signal to select between one of the most significant N-bit portion of the first PC and the second PC;

inverting the first bit to output an inverted state of the first bit: and concatenating the most significant N-bit portion selected with the inverted state of the first bit and remaining bits of the branch PC to generate an output.

19. The method as recited in claim 18 wherein the sequential address is a result of the branch instruction if the branch instruction is conditional and is not taken.

20. The method as recited in claim 18 wherein the sequential address is a link address if the branch instruction updates a link resource.

21. The method as recited in claim 20 further comprising updating the link resource with the sequential address if the selecting is performed during an execution of the branch instruction.

22. The method as recited in claim 20 further comprising updating a return stack with the sequential address if the selecting is performed during fetch of the branch instruction.

* * * * *

UNITED STATES PATENT AND TRADEMARK OFFICE
CERTIFICATE OF CORRECTION

| | | |
|---|---|---|
| PATENT NO. | : 6,874,081 B2 | Page 1 of 1 |
| APPLICATION NO. | : 09/860817 | |
| DATED | : March 29, 2005 | |
| INVENTOR(S) | : David Kruckemyer et al. | |

It is certified that error appears in the above-identified patent and that said Letters Patent is hereby corrected as shown below:

Title Page, Item (54): The title should appear as follows: --Link and fall-through address formation using a program counter portion selected by a specific branch address bit--.

Column 1, lines 1-3: The title should appear as follows: --Link and fall-through address formation using a program counter portion selected by a specific branch address bit--.

Column 14, line 14, in Claim 1: replace "the most significant" with --a most significant--.

Signed and Sealed this

Eighteenth Day of November, 2008

JON W. DUDAS
*Director of the United States Patent and Trademark Office*